US010486634B2

(12) United States Patent
Schmid

(10) Patent No.: US 10,486,634 B2
(45) Date of Patent: Nov. 26, 2019

(54) AIRBAG MODULE AND ASSEMBLY

(71) Applicant: TRW AUTOMOTIVE GMBH, Alfdorf (DE)

(72) Inventor: Juergen Schmid, Durlangen (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 72 days.

(21) Appl. No.: 15/570,412

(22) PCT Filed: May 4, 2016

(86) PCT No.: PCT/EP2016/000735
§ 371 (c)(1),
(2) Date: Oct. 30, 2017

(87) PCT Pub. No.: WO2016/180523
PCT Pub. Date: Nov. 17, 2016

(65) Prior Publication Data
US 2018/0141513 A1    May 24, 2018

(30) Foreign Application Priority Data

May 9, 2015   (DE) .................... 10 2015 006 128

(51) Int. Cl.
*B60R 21/205* (2011.01)
*B60R 21/217* (2011.01)

(52) U.S. Cl.
CPC ........ *B60R 21/205* (2013.01); *B60R 21/2176* (2013.01)

(58) Field of Classification Search
CPC . B60R 21/201; B60R 21/205; B60R 21/2176; B60R 21/2177
See application file for complete search history.

(56) References Cited

U.S. PATENT DOCUMENTS 5,765,867 A * 6/1998 French ................ B60R 21/16
280/743.1
5,992,875 A * 11/1999 Cundill ............. B60R 21/217
280/728.2

(Continued)

FOREIGN PATENT DOCUMENTS

DE    202013011881    10/2014
JP    2013035325 A * 2/2013 ........... B60R 21/215

(Continued)

*Primary Examiner* — Laura Freedman
(74) *Attorney, Agent, or Firm* — Tarolli, Sundheim, Covell & Tummino LLP

(57) ABSTRACT

The invention describes an airbag module (10) for attaching to an instrument panel, comprising an inflator (12), a fastening portion (36) which is arranged so that the airbag module (10) can be attached to the instrument panel via the fastening portion (36), a receiving portion (46) for an airbag as well as a holding portion (57) which serves for holding the inflator (12). The airbag module (10) has a support structure (16) including the fastening portion (36) and a housing (14) made from fabric material. The holding portion (57) is partially configured in a holding area (58) of the housing (14) which is opposed to the fastening portion (36) so that the inflator (12) is fastened from outside and extends at least partially into the receiving portion (46). The support structure (16) comprises at least one supporting portion (18) U-shaped in cross-section which at least partially encompasses the housing (14). In addition, the support structure (16) includes a peripheral frame (66). Moreover, a subassembly is described.

20 Claims, 21 Drawing Sheets

(56) References Cited

U.S. PATENT DOCUMENTS

| | | | | |
|---|---|---|---|---|
| 7,195,273 | B2* | 3/2007 | Lewis | B60R 21/2176 280/728.2 |
| 7,404,575 | B2* | 7/2008 | Bito | B60R 21/205 280/743.1 |
| 7,530,597 | B2* | 5/2009 | Bito | B60R 21/233 280/742 |
| 7,530,599 | B2* | 5/2009 | Williams | B60R 21/217 280/728.2 |
| 8,033,567 | B2* | 10/2011 | Ooshino | B60R 21/2176 280/728.2 |
| 8,272,664 | B2* | 9/2012 | Benny | B60R 21/201 280/728.1 |
| 8,419,048 | B2* | 4/2013 | Yamaji | B60R 21/201 280/728.3 |
| 9,387,822 | B2* | 7/2016 | Iida | B60R 21/201 |
| 9,663,063 | B2* | 5/2017 | Kunitake | B60R 21/201 |
| 2006/0220355 | A1 | 10/2006 | Yokoyama et al. | |
| 2010/0230935 | A1* | 9/2010 | Rose | B60R 21/201 280/728.2 |

FOREIGN PATENT DOCUMENTS

| | | | |
|---|---|---|---|
| JP | 2013035459 A * | 2/2013 | |
| WO | 2015024543 | 2/2015 | |
| WO | 2015024544 | 2/2015 | |
| WO | WO 2015025630 A1 * | 2/2015 | |

* cited by examiner

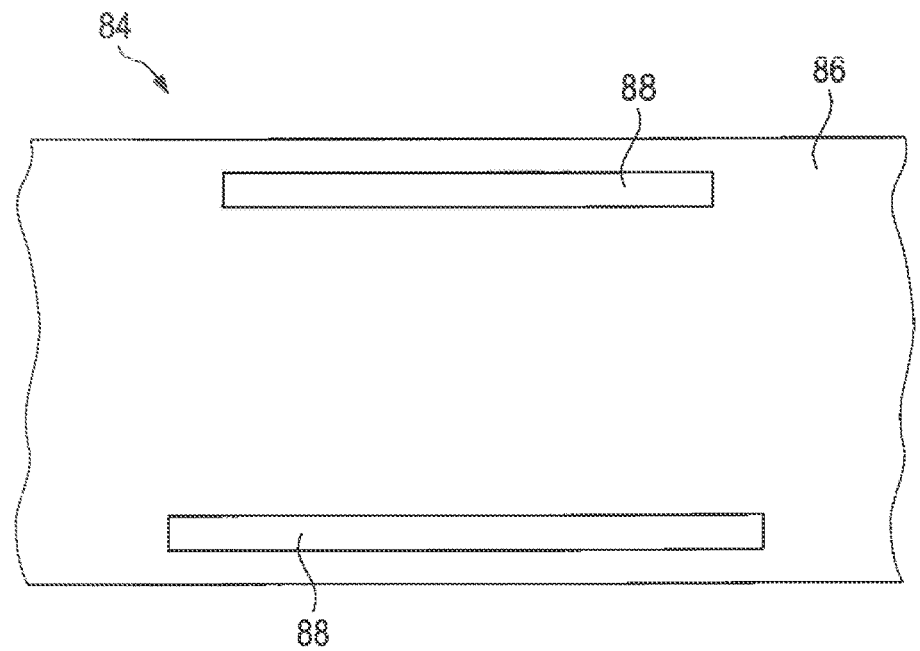
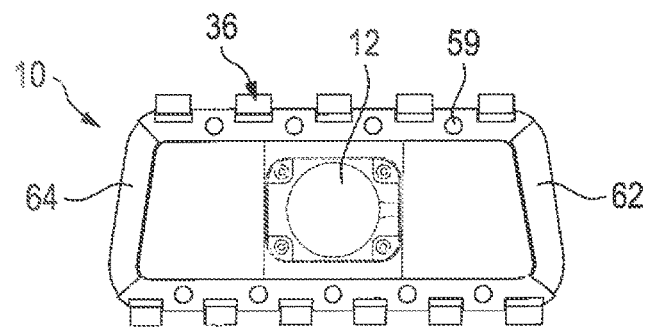
Fig. 30

AIRBAG MODULE AND ASSEMBLY

RELATED APPLICATIONS

This application corresponds to PCT/EP2016/000735, filed May 4, 2016, which claims the benefit of German Application No. 10 2015 006 128.3, filed May 9, 2015, the subject matter of which are incorporated herein by reference in its entirety.

BACKGROUND OF THE INVENTION

The invention relates to an airbag module for attaching to an instrument panel and a subassembly consisting of an instrument panel and an airbag module.

From the state of the art airbag modules that are attached directly to an instrument panel of an automotive vehicle are known. Said airbag modules usually include a massive housing in which at least one airbag is disposed in a folded state. The massive housing forms a fastening portion by which the airbag module can be attached to the instrument panel. Furthermore, an inflator for applying compressed gas to the folded airbag in the case of release so that the airbag deploys and protects a vehicle occupant in the case of crash is fixed to the massive housing.

It has turned out to be a drawback of said airbag modules known from the state of the art that due to the massive housing they have a high weight.

For solving the problem of high weight, from the state of the art also airbag modules are known that have a housing made from fabric material. Said airbag modules have a lower weight due to the fabric material.

Airbag modules of this type are known, for example, from WO 2015/024543 A1 and WO 2015/024544 A1.

However, it has turned out to be a drawback in said airbag modules known from the state of the art that the housing has a low rigidity which is equally due to the material. This entails, inter alia, lower inherent stability of the airbag module. By reason of the low rigidity of the housing and of the airbag module, inter alia fastening of the airbag module to the instrument panel and fixation of the inflator on the airbag module are impeded. Moreover, the housing is not dimensionally stable so that an accurately positioned assembly is only possible with enormous effort.

SUMMARY OF THE INVENTION

It is the object of the invention to provide an airbag module which is light-weight and has sufficiently high rigidity.

According to the invention, the object is achieved by an airbag module for attaching to an instrument panel, comprising an inflator, a fastening portion which is such that the airbag module can be attached to the instrument panel via the fastening portion, a receiving portion for an airbag as well as a holding portion which serves for holding the inflator, wherein the airbag module includes a support structure having the fastening portion and a housing made from fabric materials, and wherein the holding portion is partially formed within a holding area of the housing which is opposed to the fastening portion so that the inflator is fastened from outside and extends at least partially into the receiving portion, with the support structure including at least one supporting portion U-shaped in cross-section which at least partly encompasses the housing, and wherein the support structure includes a peripheral frame.

It is the basic idea of the invention to reduce the weight of the airbag module in that the housing is made from fabric material. The rigidity of the airbag module is increased or, resp., not reduced despite the fabric material of the housing, as there is provide the support structure which exhibits higher strength and, resp., rigidity than the housing. The rigidity of the support structure imparts sufficiently high rigidity to the entire airbag module. Due to the hybrid design of the airbag module, the advantages of the respective materials, i.e. the low weight of the fabric material as well as the strength and the stability of the support structure made from more rigid material than the fabric material can be exploited. Since, moreover, the support structure serves for fastening the airbag module to the instrument panel, the assembly of the airbag module can be ensured in a simple manner. In addition, the support structure guarantees an accurately positioned fastening of the airbag module to the instrument panel as the support structure takes a predefined shape having predefined dimensions.

The supporting portion ensures higher rigidity of the airbag module and additionally stabilizes the housing. In general, the supporting portion serves for shaping the housing having tower dimensional stability. For this purpose, the housing is adjacent at least to legs and to the bottom area of the supporting portion U-shaped in cross-section so that the legs, inter alia, provide for the shape of the housing as well as for the stabilization thereof.

The peripheral frame equally serves for stabilizing the otherwise relatively flexible housing so that, due to the stiffer support structure, it takes a defined shape at least on the fastening portion.

A peripheral frame is meant to be a frame closed in itself, viz. a frame having a continuous rim. Accordingly, in the mathematic sense the frame describes a general cylinder preferably having a rectangular base area. The height of the general cylinder substantially corresponds to the material thickness. Alternatively, the frame may include a peripheral wall or a collar projecting from the peripheral frame, especially perpendicularly to the frame.

One aspect provides that the holding portion comprises a recess in the housing and a separate holding element disposed on an inside of the housing for fixing the inflator. This ensures that the inflator can be fixed on the airbag module in a stable and safe way, even when the inflator is attached to merely a part of the less rigid holding portion. The stability is provided by the separate holding element which may be in the form of a holding ring, for example. Alternatively, the separate holding element may also be pot-shaped and frame-shaped, with the inflator extending partly into the holding element.

According to one embodiment, the support structure may include a holder and a clamping rail disposed on the latter, wherein at least one fabric layer of the housing is clamped between the holder and the clamping rail in the fastened state. This facilitates mounting of the housing on the support structure as merely one fabric layer has to be clamped for connecting the housing to the support structure.

Furthermore, the holder and the clamping rail may form a clip connection. The clip connection ensures that the clamped fabric layer cannot detach itself. Thus, the clip connection serves for an additional safeguarding.

For example, the supporting portion is formed in the area of the holding portion of the housing so that the inflator is additionally fastened to the support structure. For this purpose, the supporting portion especially includes a hole through which the inflator can be inserted. The hole of the supporting portion is aligned with the recess in the housing so that the inflator is adjacent to the outside of the supporting portion and extends through the supporting portion and the housing at least partially into the receiving portion.

Another aspect provides that the housing includes openings and the support structure includes projections engaging in said openings. Alternatively, the support structure may include openings in which the projections of the housing engage. In general, the housing can be coupled to the support structure by form closure. This helps to further facilitate assembly, as the housing may adopt a predefined position relative to the support structure due to the openings and the projections. The housing can be easily hooked into the support structure. Especially, the housing can be prepositioned on the support structure in this way, for example when the housing is later secured to the support structure.

Further, the housing may be secured with the support structure via a welded connection and/or via a clamping connection. This connection ensures that the housing is permanently or at least hardly releasably connected to the support structure. The welded and/or clamping connection can be provided especially in addition to hooking the housing into the support structure. The position of the housing relative to the support structure is determined when the housing is hooked in. After that, the housing can be secured to the support structure via the welded and/or clamping connection.

Especially, the clamping connection may include at least one clamping element, wherein at least one fabric layer of the housing is clamped between the clamping element and the support structure so as to secure the housing to the support structure. In this way, a damping connection can be later provided, although the support structure itself includes no clamping rail. In general, an additional safeguarding can be formed via the clamping element.

In accordance with one aspect, there may be provided an airbag which is connected to the housing by material closure and/or form closure. Hence the airbag has a predefined position in the receiving portion, thus ensuring a desired inflating behavior of the airbag. In particular, the airbag may be formed integrally with the housing in that, for example, the housing is constituted by an outer layer of the airbag. This facilitates the manufacture of the airbag module and the assembly thereof as fewer individual component parts are required.

Alternatively, there may be provided an airbag which is connected to the support structure by material closure and/or form closure, especially on the at least one supporting portion U-shaped in cross-section. Also in this case, the airbag has a predefined position inside the receiving portion, as the housing has a predefined position relative to the support structure. The desired inflating behavior of the airbag thus can equally be obtained, in addition, the manufacture of the airbag module as well as the assembly thereof is facilitated in this embodiments too.

Another aspect provides that the housing is connected to the support structure in the area of the fastening portion. This ensures that the housing is connected to the support structure in the area exhibiting maximum stability. Thus, the housing is shaped and said shape is maintained in a simple manner.

In accordance with one aspect, the peripheral frame forms the fastening portion. The airbag module can be arranged on the instrument panel so that the forces occurring are distributed as evenly as possible over the closed-type frame. For this purpose, in the case of a substantially rectangularly peripheral frame all four legs may include appropriate means by which the airbag module, especially the support structures can be connected to the instrument panel. Otherwise, uniform application of force to the frame is also guaranteed, as all legs of the peripheral and, resp., closed-type frame are structurally, especially integrally, interconnected.

The at least one U-shaped supporting portion can be formed integrally with the peripheral frame. The entire support structure thus can be integrally formed, which renders the manufacture thereof especially simple. The support structure may be an injection-molded part which is made from plastic material, for example.

The support structure is preferably manufactured so that the walls of the support structure, viz. of the frame and the supporting portion, include ribs. The ribs ensure the required rigidity, while at the same time material can be saved. The rib design of the support structure provides for an optimum rigidity-to-weight ratio.

Another aspect provides that a collar projects perpendicularly from the peripheral frame, especially in a direction opposite to the at least one U-shaped supporting portion. The collar serves, inter alia, for shaping the housing and optionally for fastening the same. Moreover, it is possible in this way to form the fastening portion at the support structure to be slightly recessed vis-à-vis the projecting collar. Alternatively formulated, the peripheral frame projects laterally from the lower end of the collar.

There may also be provided a peripheral wall that is equally collar-shaped and extends in the direction of the at least one U-shaped supporting portion. Said peripheral wall, too, serves for stabilizing and shaping the housing.

The support structure, in particular the at least one U-shaped supporting portion, may at least partially form the holding portion. The inflator can be mounted on the U-shaped supporting portion, thus causing the inflator to be held safely and accurately positioned due to the inherent stability of the support structure.

Moreover, the U-shaped supporting portion may serve as the only fastening for the airbag, especially when the U-shaped supporting portion interacts with the holding element.

In accordance with one embodiment, the support structure comprises two supporting portions being U-shaped in cross-section which at least partially encompass the housing. This embodiment is suited for tubular ands resp., cylindrical inflators having a certain elongate extension. The inflator then may be coupled over its length at two points, viz. the two supporting portions, to the support structure. In this way, the inflator is fastened to the support structure in a rotationally fixed manner.

In general, it is possible for the airbag to be provided with an additional protective cover. The protective cover can enclose merely the airbag or the housing receiving the airbag.

Irrespective thereof, the folded airbag may be an, especially thermally fixed, package.

The invention further relates to a subassembly consisting of an instrument panel and an airbag module of the afore-mentioned type. The design of the airbag module comprising the afore-mentioned characteristics ensures that a subassembly which is easy to manufacture and to assemble can be provided.

According to one aspect, the instrument panel may be provided to include holding elements in which the airbag module can be inserted and mounted. Accordingly, especially a bayonet lock via which the airbag module is connected to the instrument panel can be provided. This again facilitates the assembly of the airbag module.

BRIEF DESCRIPTION OF THE DRAWINGS

Further advantages and characteristics will be evident from the following description and the drawings which are referred to, wherein:

FIG. 30 shows a subassembly according to the invention.

DESCRIPTION

Figure 1:
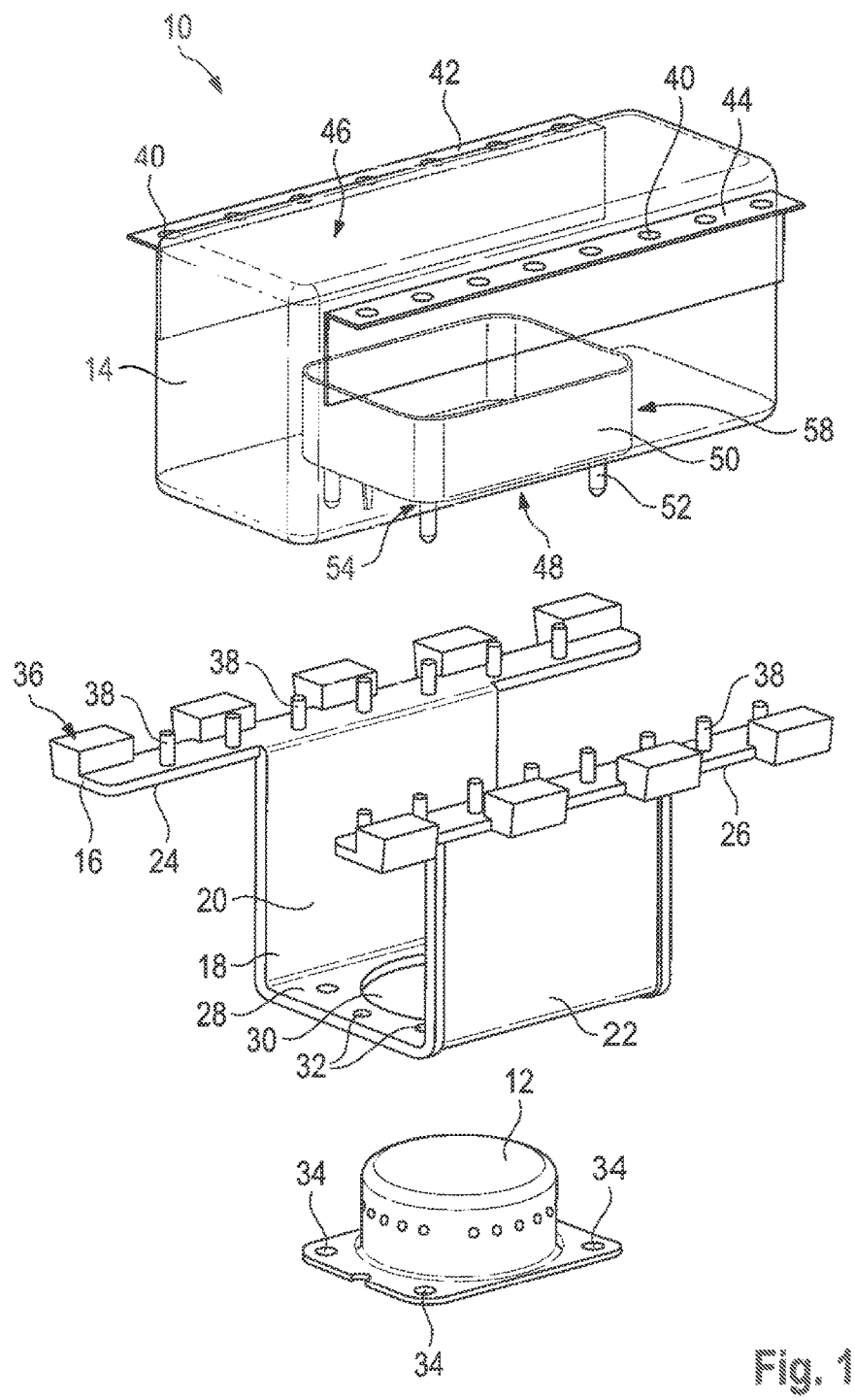
FIG. 1 shows an exploded view of an airbag module.

In FIGS. 1 to 5 a first airbag module 10 is illustrated. FIG. 1 shows the airbag module 10 in an exploded view which shall at first be referred to.

The airbag module 10 comprises an inflator 12, a housing 14 made from fabric material and a support structure 16. The support structure 16 may be made from plastic material, light alloy or any other material having 20 higher rigidity and, resp., strength than the fabric material of the housing 14.

The support structure 16 has a supporting portion 18 being U-shaped in cross-section and merging with each of its two free legs 20, 22 into a strip 24, 26 of the support structure 16. The strips 24, 26 25 consequently are formed integrally with the two legs 20, 22.

Further, the supporting portion 18 includes a bottom area 28 in which a hole 30 formed centrally in the bottom area 28 is provided. The inflator 12 can be inserted via the hole 30 through the supporting portion 18 and thus through the support structure 16 (cf. especially FIGS. 3 and 5).

In the bottom area 28 furthermore fastening holes 32 are provided which are aligned with fixing holes 34 at the inflator 12 when the inflator 12 partially extends through the hole 30, as will be explained hereinafter.

The support structure 16 further includes a fastening portion 36 formed by the two strips 24, 26. The fastening portion 36 is formed on the side of the support structure 16 opposed to the hole 30, i.e. that the fastening portion 36 is provided on the side of the support structure 16 facing away from the inflator 12. The airbag module 10 can be attached to an instrument panel not shown here via the fastening portion 36.

Figure 2:
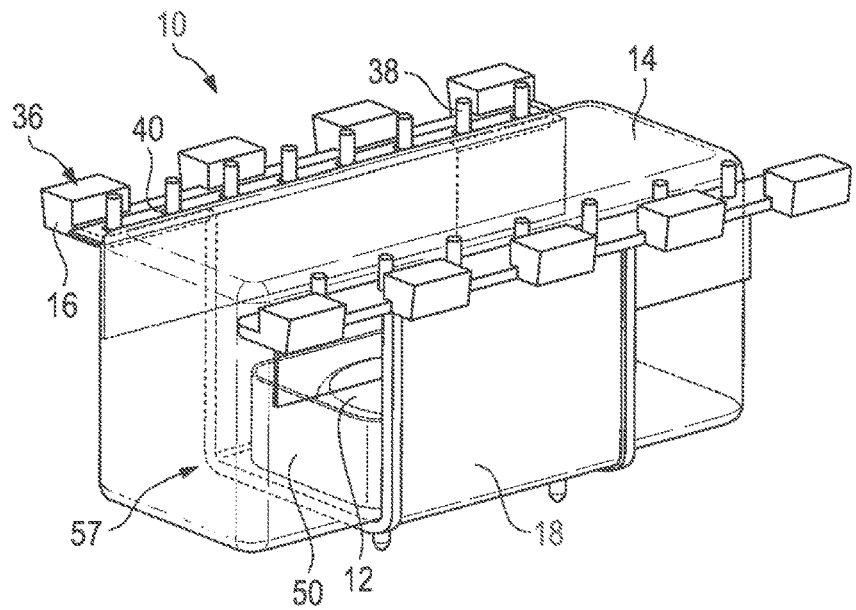
FIG. 2 shows a perspective view of the airbag module of FIG. 1.
Figure 3:
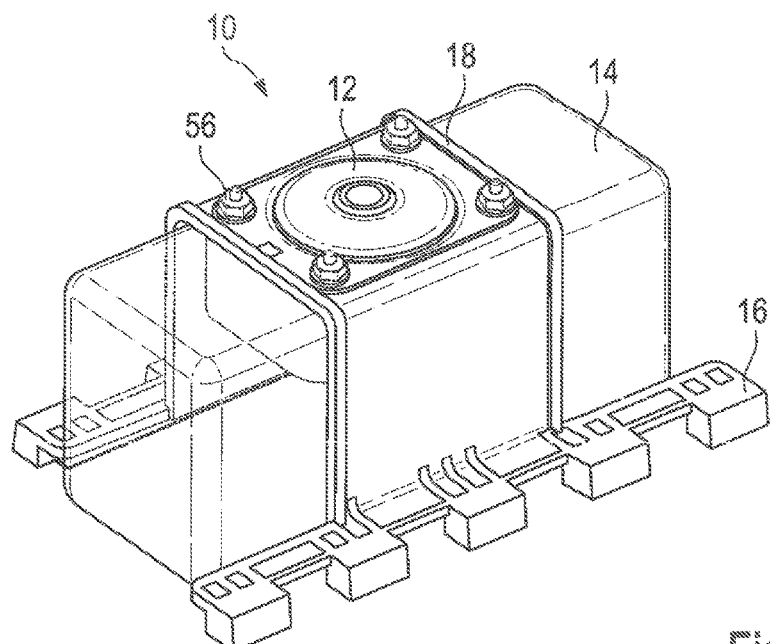
FIG. 3 shows a perspective view of the lower side of the airbag module according to FIGS. 1 and 2.
Figure 4:
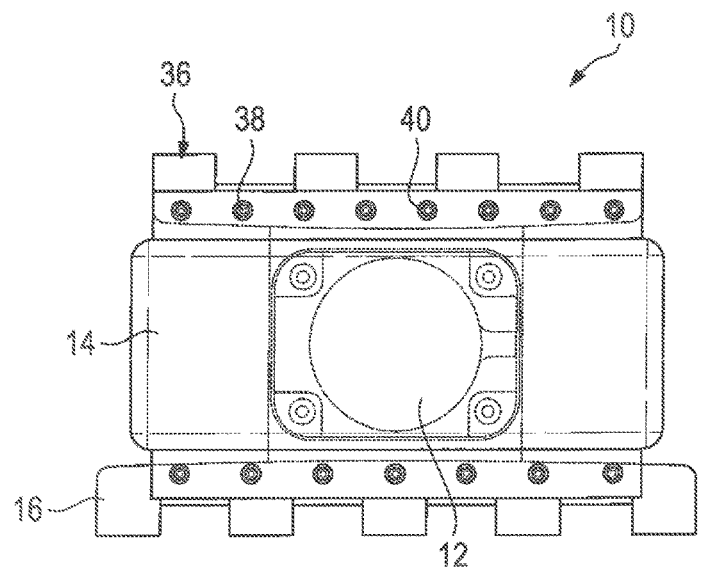
FIG. 4 shows a top view onto the upper side of the airbag module according to FIGS. 1 to 3.
Figure 5:
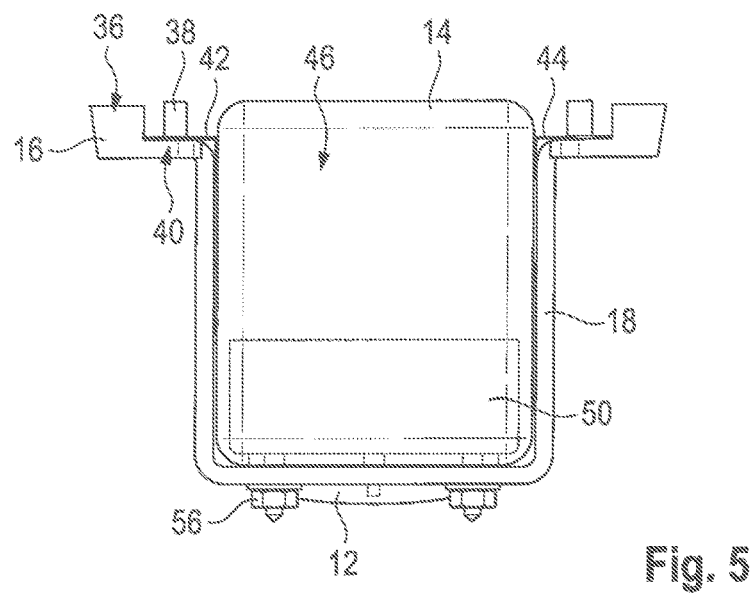
FIG. 5 shows a side view of the airbag module according to FIGS. 1 to 4.

At the strips 24, 20 furthermore projections 38 are provided which in the assembled state of the airbag module 10 engage in openings 40 configured at the housing 14 (cf. especially FIGS. 2 and 5). The openings 40 are configured at each of two laterally projecting hook-in strips 42, 44 of the housing 14. The housing 14 can be hooked into the support structure 16 via the openings 40. In this way, a predefined positioning, especially pre-positioning, of the housing 14 relative to the support structure 16 can be performed.

Alternatively, the hook-In strips 42, 44 may be formed separately from the housing 14. For example, the hook-in strips 42, 44 may be angled, wherein they are fastened by a first leg to the housing 14 and the second leg includes the openings 40. The leg fastened to the housing 14 may be fastened to an inside or outside of the housing 14. The separately formed hook-in strips 42, 44 may consist of a fabric layer of the fabric material of the housing 14. As an alternative, the material may as well be a different fabric material or a different material.

The hook-in strips 42, 44 are configured separately and substantially L-shaped (cf. especially FIG. 5), wherein they are fastened by the longer leg to the housing 14 and the shorter leg includes the openings 40.

From FIGS. 2 and 5 it is moreover evident that the housing 14 is hooked with at least one fabric layer at the support structure 16.

Furthermore, the housing 14 includes a receiving portion 46 which serves for receiving an airbag not shown here. The receiving portion 46 is delimited by the sidewalls of the housing 14 and is formed by the space delimited by the sidewalls.

The housing 14 also includes a recess 48 which is aligned with the hole 30 in the supporting portion 18 when the housing 14 is hooked into the support structure 16 (see especially FIGS. 2 to 5).

Further, a separate holding element 50 arranged in the receiving portion 46 and assigned to the recess 48 is shown. The holding element 60 is pot-shaped, wherein it is additionally frame-shaped so that it has neither a cover nor a bottom. This is evident, inter alia, from FIG. 4 in which the airbag module 10 is shown in a top view in the assembled state. The inflator 12 extends from outside and from the bottom into the pot-shaped holding element 50 and is visible in the top view.

The holding element 50 in addition includes fastening elements 52 extending, in the assembled state of the airbag module 10, through receiving holes 54 in the bottom of the housing 14, the fastening holes 32 of the support structure 16 and the fixing holes 34 of the inflator 12 (cf. especially FIGS. 3 to 6). Subsequently, fixation is carried out by corresponding counter-means 56 so that the housing 14 is fixed to the support structure 16 and the inflator 12 is fixed to the support structure 16, especially the supporting portion 18, and to the holding element 50. The fastening elements 52 and the counter-means 56 may especially be a screw-and-nut connection.

In general, the airbag module 10 includes a holding portion 57 serving for holding the inflator 12 in the assembled state (cf. FIG. 2). The holding portion 57 is formed, inter alia, by a holding area 58 of the housing 14. The holding area 58 is substantially formed by the recess 48 in the housing 14. In the assembled state, the holding area 58 is opposed to the fastening portion 36.

The holding portion 57 additionally is formed by the bottom area 28 of the supporting portion 18 and by the holding element 50 which provide the required rigidity for fixing the inflator 12.

Accordingly, the inflator 12 is attached from outside to the housing 14 and the support structure 16, wherein it extends into the receiving portion 46 provided in the inferior. This is possible because the holding area 58 includes corresponding recesses, especially the hole 30 and the recess 48.

After hooking the housing 14 into the support structure 16 (of. FIG. 2), the housing 14 can be additionally secured to the support structure 16 5 by means of a welded joint.

The airbag (not shown here) which is arranged in the receiving portion 46 can be connected to the housing 14 by material closure and/or form closure. Especially, the housing 14 can be formed by an outer layer of the airbag so that the manufacture and the assembly are appropriately facilitated.

As an alternative, the airbag can be connected to the support structure 16 by material closure and/or form closure so that it takes a defined position with respect to the support structure 16. Since the housing 14 equally takes a predefined position relative to the support structure 16, especially by reason of the openings 40 and the projections 38, the airbag is ensured to adopt a predefined position inside the receiving portion 46. In this way, the desired inflating behavior of the airbag is safeguarded.

Figure 6:
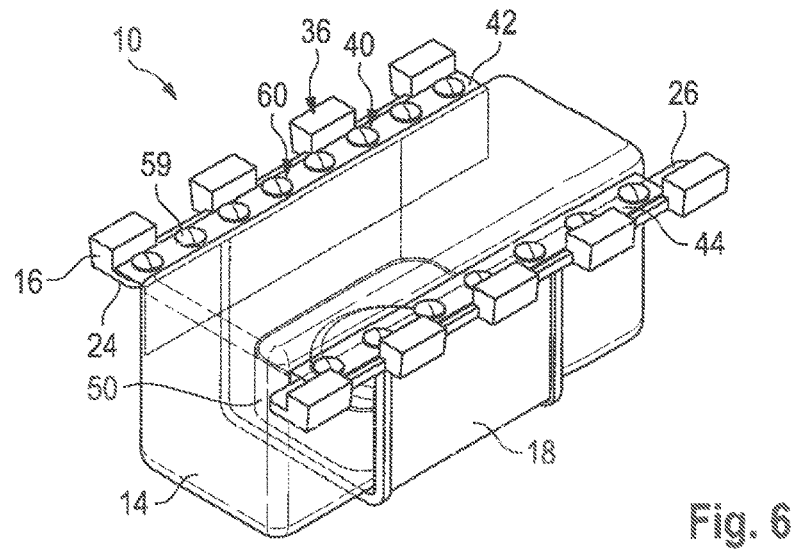
FIG. 6 shows a perspective view of an airbag module.
Figure 7:
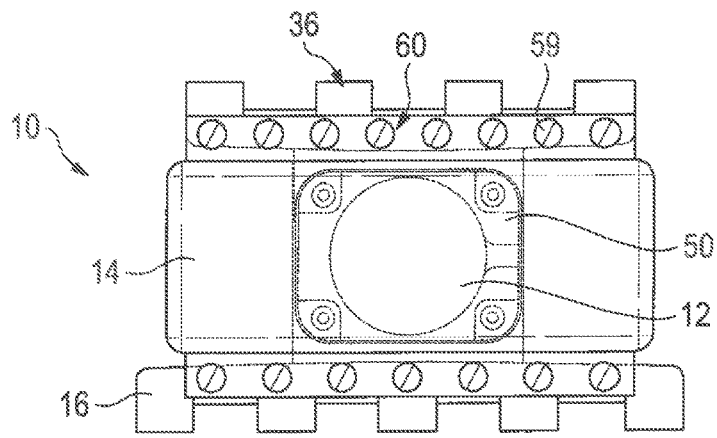
FIG. 7 shows a top view onto the upper side of the airbag module according to FIG. 6.
Figure 8:
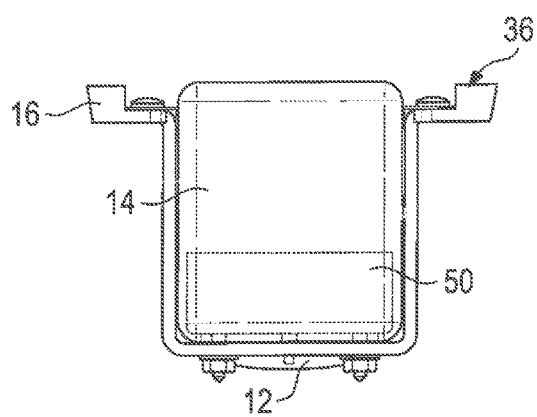
FIG. 8 shows a side view of the airbag module according to FIGS. 6 and 7.
Figure 9:
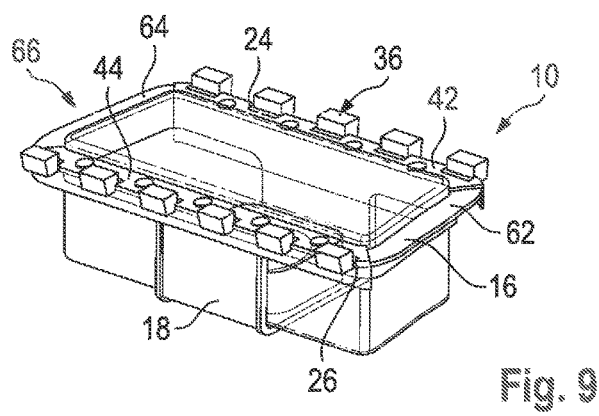
FIG. 9 shows a perspective view of an airbag module according to the invention.
Figure 10:
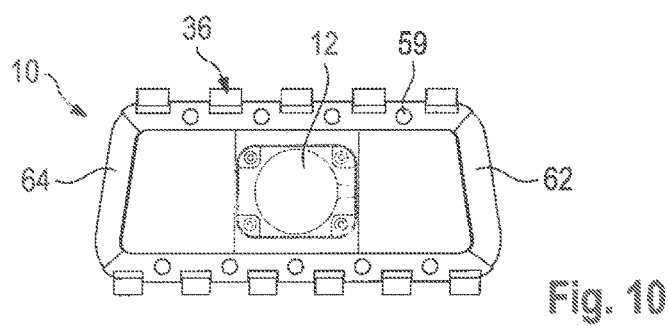
FIG. 10 shows a top view onto the upper side of the airbag module according to the invention of FIG. 9.
Figure 11:
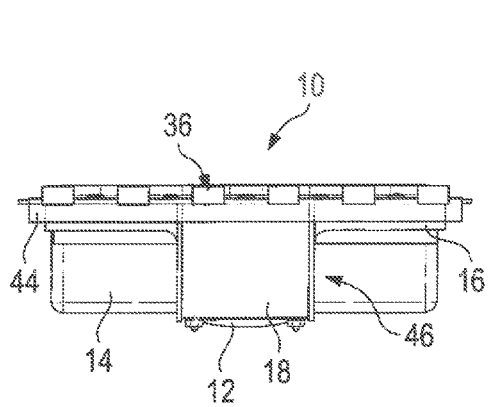
FIG. 11 shows a side view of the airbag module according to the invention of FIGS. 9 and 10.
Figure 12:
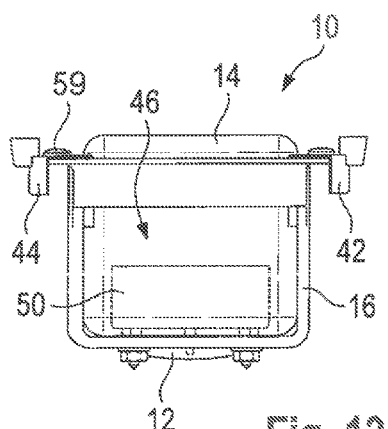
FIG. 12 shows another side view of the airbag module according to the invention of FIGS. 9 to 11.
Figure 13:
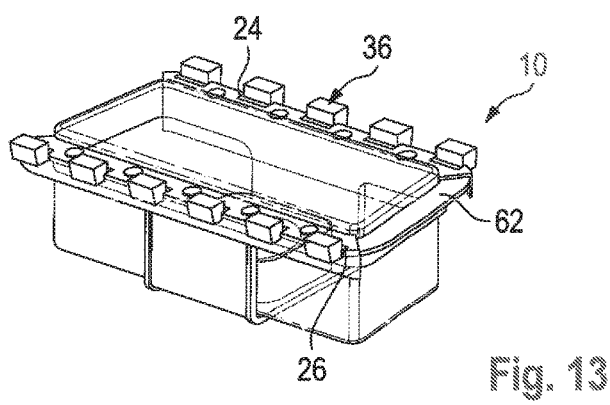
FIG. 13 shows a perspective view of an airbag module.
Figure 14:
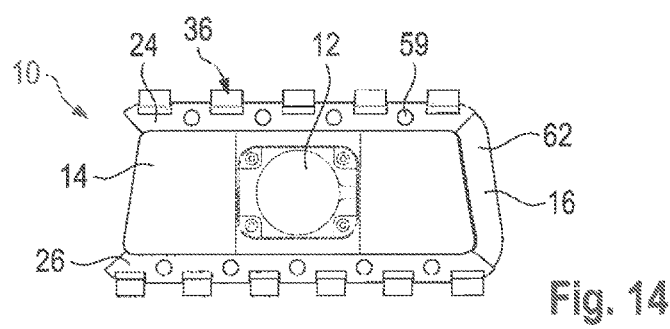
FIG. 14 shows a top view onto the upper side of the airbag module according to FIG. 13.
Figure 15:
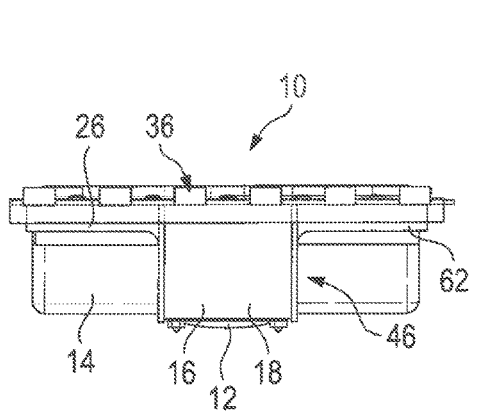
FIG. 15 shows a side view of the airbag module according to FIGS. 13 and 14.
Figure 16:
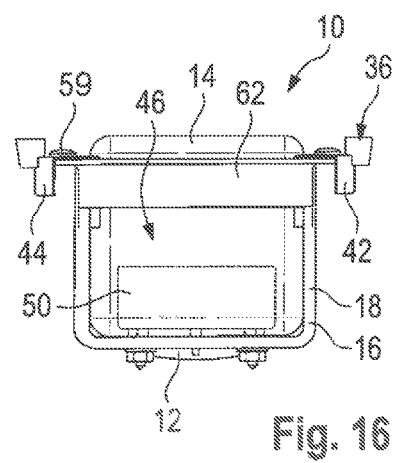
FIG. 16 shows another side view of the airbag module according to FIGS. 13 to 15.
Figure 17:
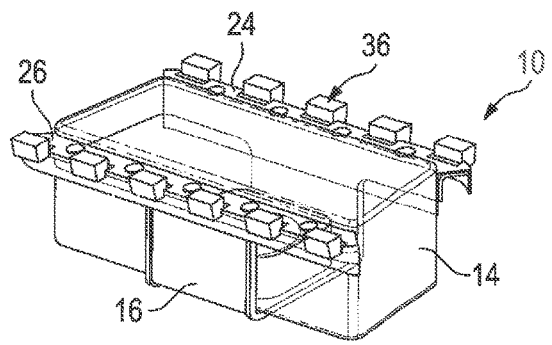
FIG. 17 shows a perspective representation of an airbag module according to the invention.
Figure 18:
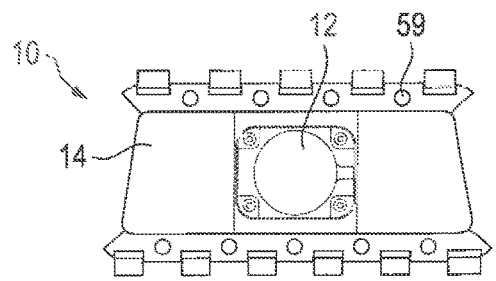
FIG. 18 shows a top view onto the upper side of the airbag module according to FIG. 17.
Figure 19:
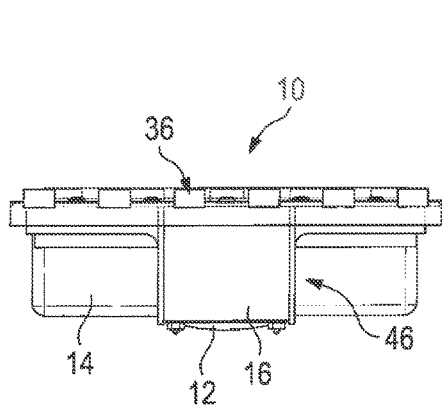
FIG. 19 shows a side view of the airbag module according to FIGS. 17 and 18.
Figure 20:
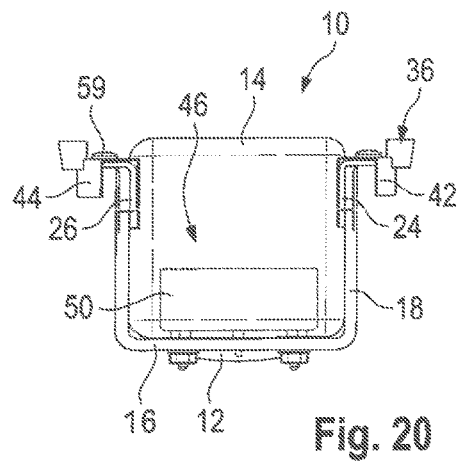
FIG. 20 shows another side view of the airbag module according to FIGS. 17 to 19.
Figure 21:
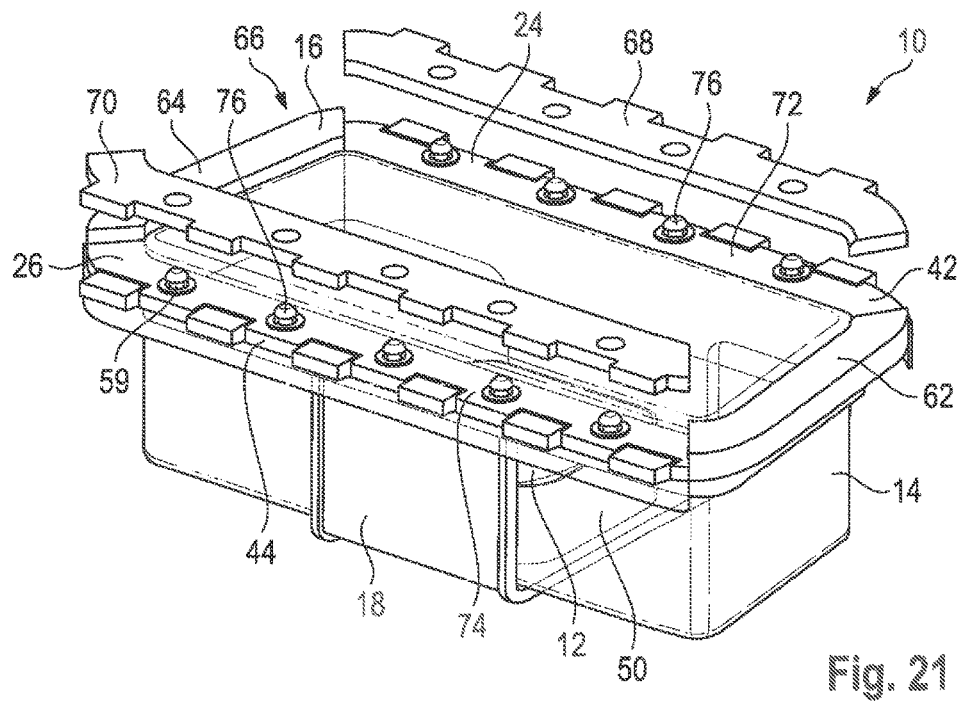
FIG. 21 shows a perspective view of an airbag module according to the invention in accordance with another embodiment in the non-assembled state.

In FIGS. 6 to 8 a different airbag module 10 is shown. Hereinafter merely the differences will be discussed.

The housing 14 is fastened to the support structure 16 via additional plug-in elements 59 extending through the openings 40 inside the housing 14. Furthermore, the plug-in elements 59 interact with plug-in holes 60 of the support structure 16 which are provided instead of the projections 38 in the strips 24, 26.

The plug-in elements 59 may be rivet elements, for example, so that a permanent connection of the support structure 16 to the housing 14 is safeguarded.

The airbag module 10 shown in FIGS. 6 to 8 thus differs from that of FIGS. 1 to 5 by the type of connection or, resp., the type of coupling of the housing 14 to the support structure 16.

FIGS. 9 to 12 illustrate an embodiment of the airbag module 10 which differs from the afore-described airbag module in that the two strips 24, 26 of the support structure 16 are connected via cross-legs 62, 64 so that a peripheral frame 66 is formed.

The peripheral frame 66 backs the shaping of the housing 14 which is more easily formable due to its fabric material. Moreover, the peripheral frame 66 imparts higher rigidity to the airbag module 10.

The fastening portion 36 is constituted merely by the two strips 24, 26 so that it corresponds to that of the preceding embodiments.

Consequently, the fastening portion 36 is provided within the area of the peripheral frame 66. In the same area, also the housing 14 is coupled to the support structure 16 which includes the peripheral frame 66.

The supporting portion 16 being U-shaped in cross-section extends only over a partial length of the peripheral frame 66. It is evident from FIGS. 9 and 10 that the housing 14 does not extend over the cross-legs 62, 64 but over the two strips 24, 26 only, because the hook-in strips 42, 44 interact with the two strips 24, 26. Nevertheless, the housing 14 is adjacent to the cross-legs 62, 64.

Alternatively, the housing 14 can be configured so that it extends also over the cross-legs 62, 64 and thus over the entire frame 66.

In FIGS. 13 to 16 a different airbag module 10 is illustrated which differs from the afore-described airbag module shown in FIGS. 9 to 12 merely to the effect that only the first cross-leg 62 is provided.

The two strips 24, 26 as well as the first cross-leg 62 form a sub-frame of the support structure 16 U-shaped in the top view.

In this case, too, the fastening portion 36 is formed merely by the two strips 24, 26.

FIGS. 17 to 20 illustrate another airbag module 10. This airbag module 10 differs from the airbag module shown in FIGS. 6 to 8 to the effect that the two strips 24, 26 are curved at their respective ends. This can be inferred especially from FIGS. 17, 18 and 20.

At their respective ends the strips 24, 26 have a curvature directed to the opposed end of the other strip. In this way, the shaping of the housing 14 is backed.

FIGS. 21 to 25 illustrate another embodiment of the airbag module 10 substantially corresponding the embodiment of the airbag module 10 according to FIGS. 9 to 12, as the two stops 24, 26 and the two cross-legs 62, 64 are provided so that the support structure 16 includes the peripheral frame 68.

This embodiment of the airbag module 10 differs from the afore-described embodiment to the effect that additionally two clamping elements 68, 70 are provided which form a clamping connection with the two strips 24, 26, wherein at least one fabric layer of the housing 14 is clamped between the clamping elements 68, 70 and the two strips 24, 26.

The at least one fabric layer of the housing 14 may especially be that of the separately formed hook-in strips 42, 44.

The two strips 24, 26 as well as the two cross-legs 62, 64 form the peripheral frame 66, as already afore-mentioned, with the two strips 24, 26 additionally serving as clamping strips 72, 74 as they interact with the clamping elements 68, 70. Thus, the clamping elements 66, 70 form a clamping connection with the clamping strips 72, 74.

Figure 22:
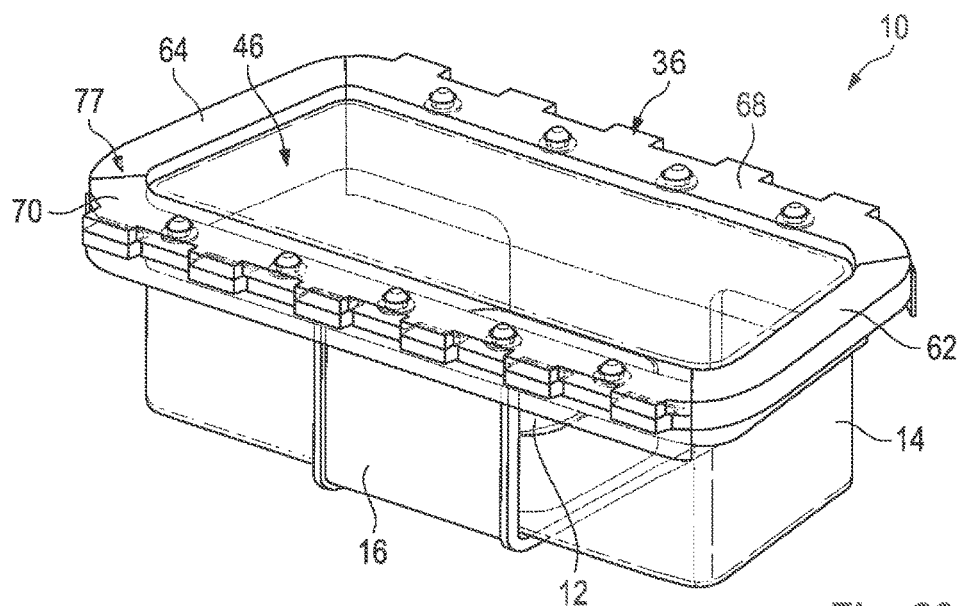
FIG. 22 shows the perspective view of the airbag module according to the invention of FIG. 21 in the assembled state.
Figure 23:
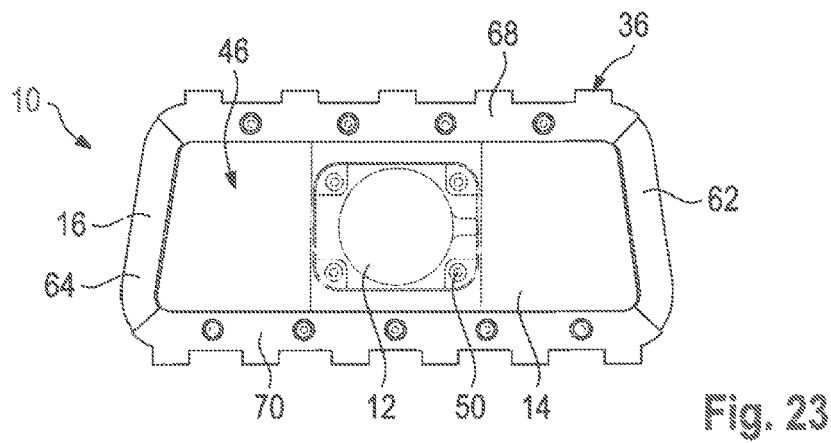
FIG. 23 shows a top view onto the upper side of the airbag module according to the invention of FIG. 22.
Figure 24:
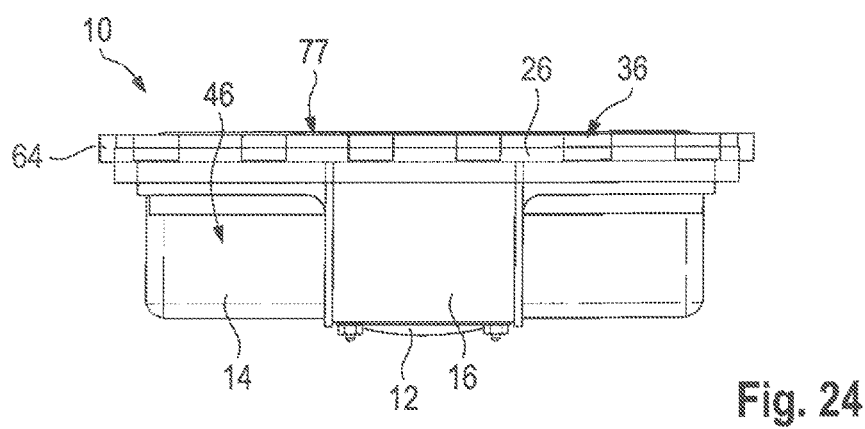
FIG. 24 shows a side view of the airbag module according to the invention of FIGS. 22 and 23.
Figure 25:
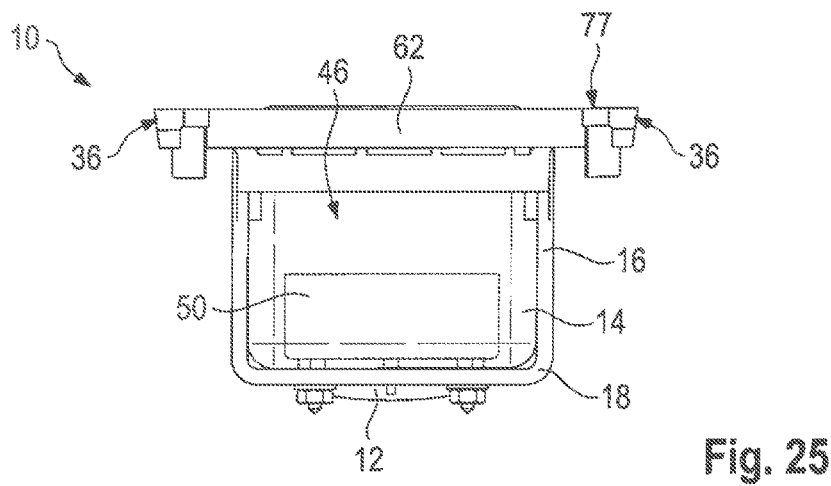
FIG. 25 shows another side view of the airbag module according to the invention of FIGS. 22 to 24.

Furthermore, the plug-in elements 59 in the shown embodiment are formed by clip elements having been plugged through the plug-in openings in the strips 24, 26 and the openings 40 of the housing 14. The plug-in elements 59 have been introduced from the lower side of the support structure 16 so that they are opposed, with their active clip end portions 76, to the clamping elements 68, 70 which may be attached. Therefore, the clamping connection is additionally configured as a clip connection by which the housing 14 is additionally secured to the support structure 16. This is shown in FIG. 22.

In general, the clip connection can be designed so that it is no longer releasable or is only releasable using a tool.

The two cross-legs 62, 64 furthermore are configured to be higher as compared to the afore-described embodiment so that they form a substantially planar surface 77 with the attached clamping elements 68, 70. At the same time, the clamping elements 68, 70 also comprise elements for the fastening portion 36 by which the airbag module 10 can be attached to an instrument panel.

In general, the clamping elements 68, 70 exhibit a contour substantially equal to the strips 24, 26 so that they can be attached flush with the latter. The elements of the clamping elements 68, 70 forming the fastening portion 36 rest on the elements of the strips 24, 26 forming the fastening portion 36 in a correspondingly flush manner.

This embodiment thus differs from the afore-described embodiment by the connection of the housing 14 to the support structure 16.

Figure 26:
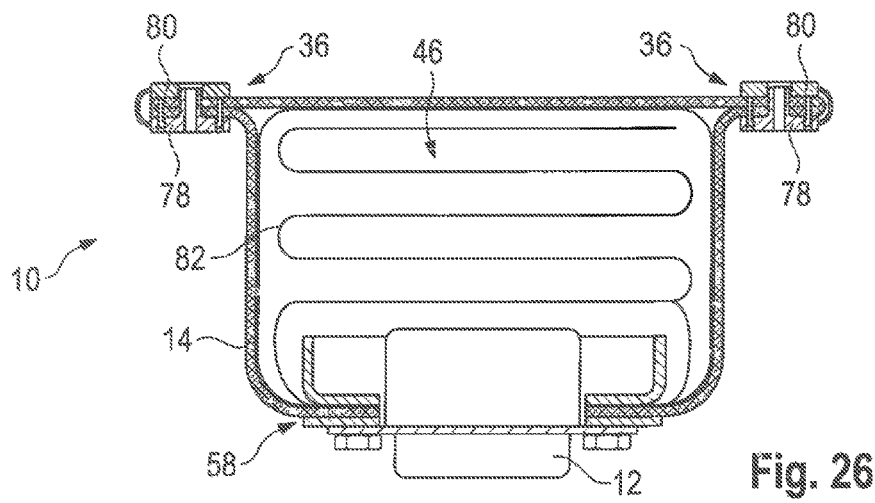
FIG. 26 is a sectional representation of an airbag module according to the invention in accordance with another embodiment.

In FIG. 26 another embodiment of the airbag module 10 is shown in which the airbag module 10 is shown in a cut state.

Figure 27:
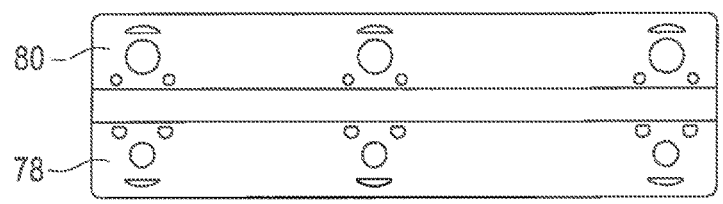
FIG. 27 shows a top view onto a holder of the airbag module according to the invention of FIG. 26.

In this embodiment, the support structure 16 includes two holders 78 each having a clamping rail 80 attached thereto which are adapted to be folded over a hinge-type portion (cf. FIG. 27). This will be illustrated below by way of FIGS. 28 and 29.

The fastening portion 36 via which the airbag module 10 can be mounted to the instrument panel can be formed at the two holders 78 including the clamping rails 80 attached thereto.

Figure 28:
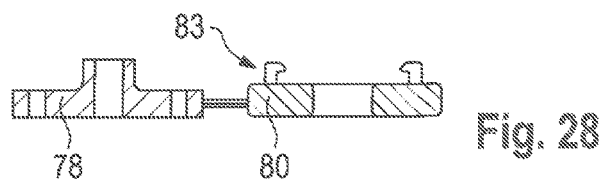
FIG. 28 is a sectional representation of the holder according to FIG. 27 in the opened state.
Figure 29:
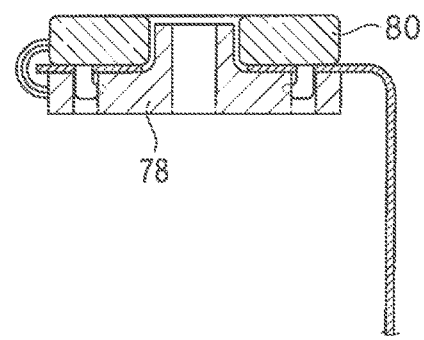
FIG. 29 shows the holder of FIG. 27 in the closed stats with a clamped fabric layer.
Figure 31:
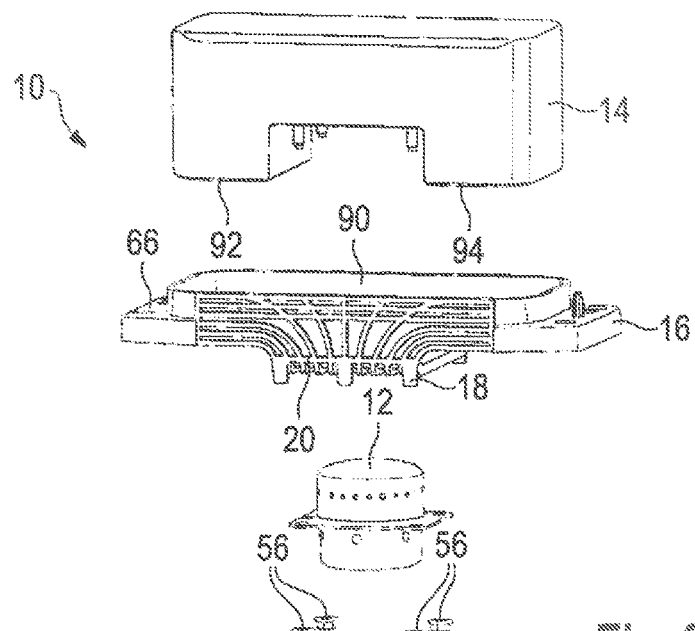
FIG. 31 shows a perspective view of an airbag module according to the invention in accordance with another embodiment in the non-assembled state.
Figure 32:
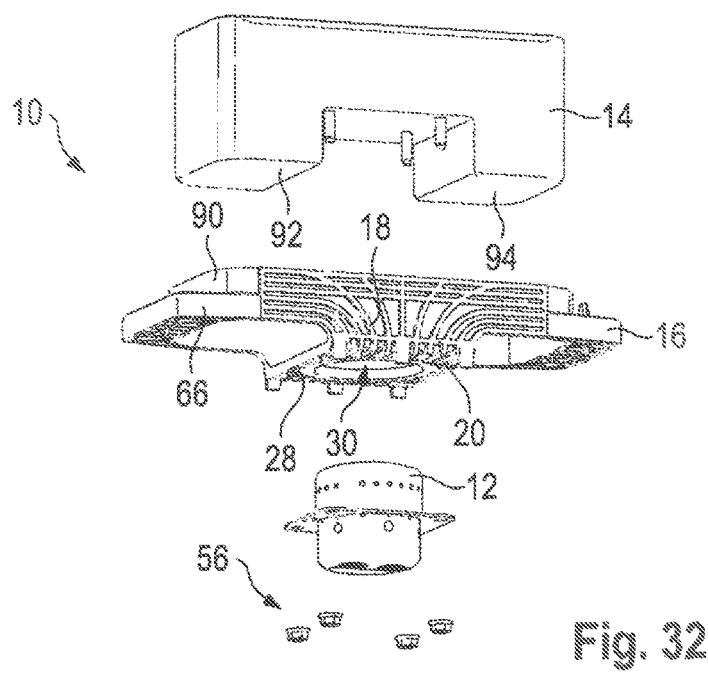
FIG. 32 shows another perspective view of the airbag module according to FIG. 31.

The supporting portion 18 being U-shaped in cross-section merges into the holder 78, which is indicated in FIG. 26 only in the lower holding portion 58 of the housing 14 for reasons of better illustration, whereas this is not shown in FIGS. 27 to 29.

The support structure 16 may include a peripheral frame 66 whose fastening portion 36 is formed at least by the two holders 78, especially in addition by the two cross-legs 62, 64 (not shown here).

Accordingly, the entire frame 66 can form the fastening portion 36.

The embodiment shown in FIG. 26 differs from that of FIGS. 21 to 25 to the effect that the clamping connection is configured by holders 78 shown in detail in FIG. 27 each having a clamping rail 80 attached thereto so that the clamping rails 80 are arranged to be captive. Furthermore, FIG. 26 shows an airbag 82 that is received in the receiving portion 46 of the airbag module 10.

From FIGS. 28 and 29 illustrating one of the two holders 78 including the clamping rail 80 attached thereto in the cut state it becomes clear that the holder 78 and the clamping rail 80 additionally configure a clip connection 83, as corresponding locking elements and holes are provided.

In the closed state (cf. FIG. 29) at least one fabric layer of the housing 14 is clamped between the holder 78 and the clamping rail 80, thus enabling the housing 14 to be additionally secured to the support structure 16.

This at least one fabric layer may be that of the hook-in strips 42, 44 which are mounted on the housing 14.

In FIG. 30 a subassembly 84 comprising an airbag module 10 and an instrument panel 86 shown in portions only is illustrated.

Fixing elements 88 via which the airbag module 10 can be fastened to the instrument panel 86 are provided on the instrument panel 86. For this purpose, the airbag module 10 may be inserted into the fixing elements 88 via its fastening portion 36 and may be subsequently fixed. The fixation can especially be provided by a bayonet lock, thus providing an additional securing.

In the shown embodiment, the airbag module 10 according to the embodiment shown in FIGS. 9 to 12 is illustrated. As a matter of course, all further embodiments of the airbag module 10 can be equally fastened to the instrument panel 86.

In this way, universally applicable fixing elements 38 which enable a plurality of different airbag modules 10 to be fixed on the instrument panel 86 may be provided at the instrument panel 86.

In FIGS. 31 to 35 another embodiment of the airbag module 10 according to the invention is shown.

The airbag module 10 comprises the inflator 12, the housing 14 and the support structure 16 including the supporting portion 18 U-shaped in cross-section which is formed centrally on the support structure 16 in the shown embodiment.

Figure 33:
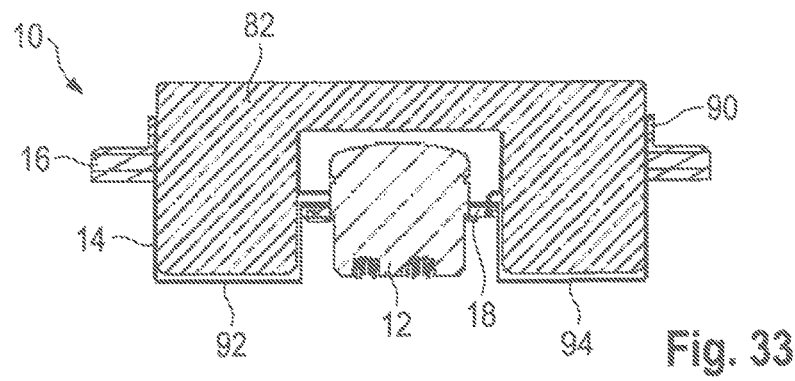
FIG. 33 shows a sectional view of the airbag module according to FIGS. 31 and 32.
Figure 34:
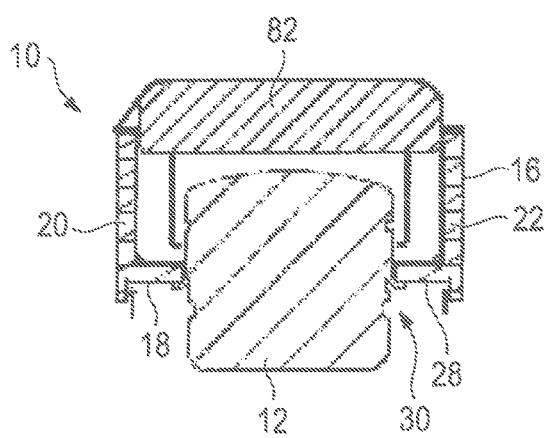
FIG. 34 shows another sectional view of the airbag module according to FIGS. 31 to 33.
Figure 35:
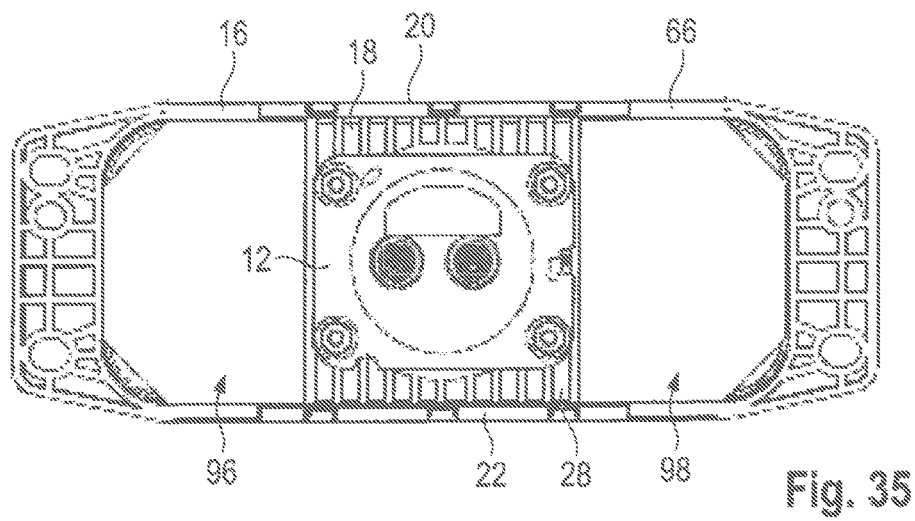
FIG. 35 shows a view from the bottom onto the airbag module according to FIGS. 31 to 34.

In the housing 14 the airbag 82 is arranged in the folded state, as is evident from FIGS. 33 and 34 in which the airbag 82 is illustrated as a compact element for reasons of better representation.

The two legs 20, 22 of the U-shaped supporting portion 18 merge into the peripheral frame 66 of the support structure 16. The supporting 10 portion 18 in addition includes, analogously to the preceding airbag modules 10, a bottom area 28 having a central hole 30 through which the inflator 12 extends.

Further, in the shown figures, the counter-means 56 are illustrated which serve for fixing the inflator 12 to the holding element 50 being arranged already in the housing 14 in the shown figures. Merely the fastening elements 52 of the holding element 50 protrude from the housing 14, as already described before.

The support structure 16 includes, apart from the peripheral frame 66, a collar 90 projecting therefrom which projects substantially perpendicularly from the peripheral frame 66 while especially pointing away from the supporting portion 18.

Moreover, it is shown that the support structure 16 includes ribs, especially in the area of the supporting portion 18. In general, the ribs contribute to the high rigidity of the support structure 18, while at the same time it has a low weight.

The embodiment shown in FIGS. 31 to 35 substantially corresponds to the embodiment shown in FIGS. 9 to 12.

The housing 14 is arranged in an analogous manner on the support structure 16 in the area of the fastening portion 36, which is not shown in the illustrated Figures for reasons of clarity.

As regards the fastening techniques as well as the various options of coupling and securing the housing 14 to the support structure 16, it is referred to the already mentioned and afore-described options.

It can be inferred especially from FIG. 33 that the inflator 12 is arranged in the airbag module 10 such that the inflator 12 does not constitute the bottom part of the airbag module 10.

Accordingly, the housing 14 is configured such that it includes two foot portions 92, 94 extending through corresponding openings 96, 98 of the support structure 16 (cf. FIG. 35) being provided on each side of the U-shaped supporting portion 18.

The two foot portions 92, 94 exhibit such length that they protrude beyond the inflator 12 when the latter is fastened to the support structure 16 (cf. FIG. 33).

The support structure 16 is configured, due to the rib-type design and the peripheral frame 66, so that it ensures sufficient rigidity of the airbag module 10 and at the same time is optimized as to weight so that in total a very light-weight and inherently stable airbag module 10 is provided.

In FIGS. 38 to 42 another embodiment of the airbag module according to the invention is illustrated in different views.

This embodiment differs from the afore-described embodiment in that additionally a protective cover 100 for the airbag 82 is provided.

Figure 36:
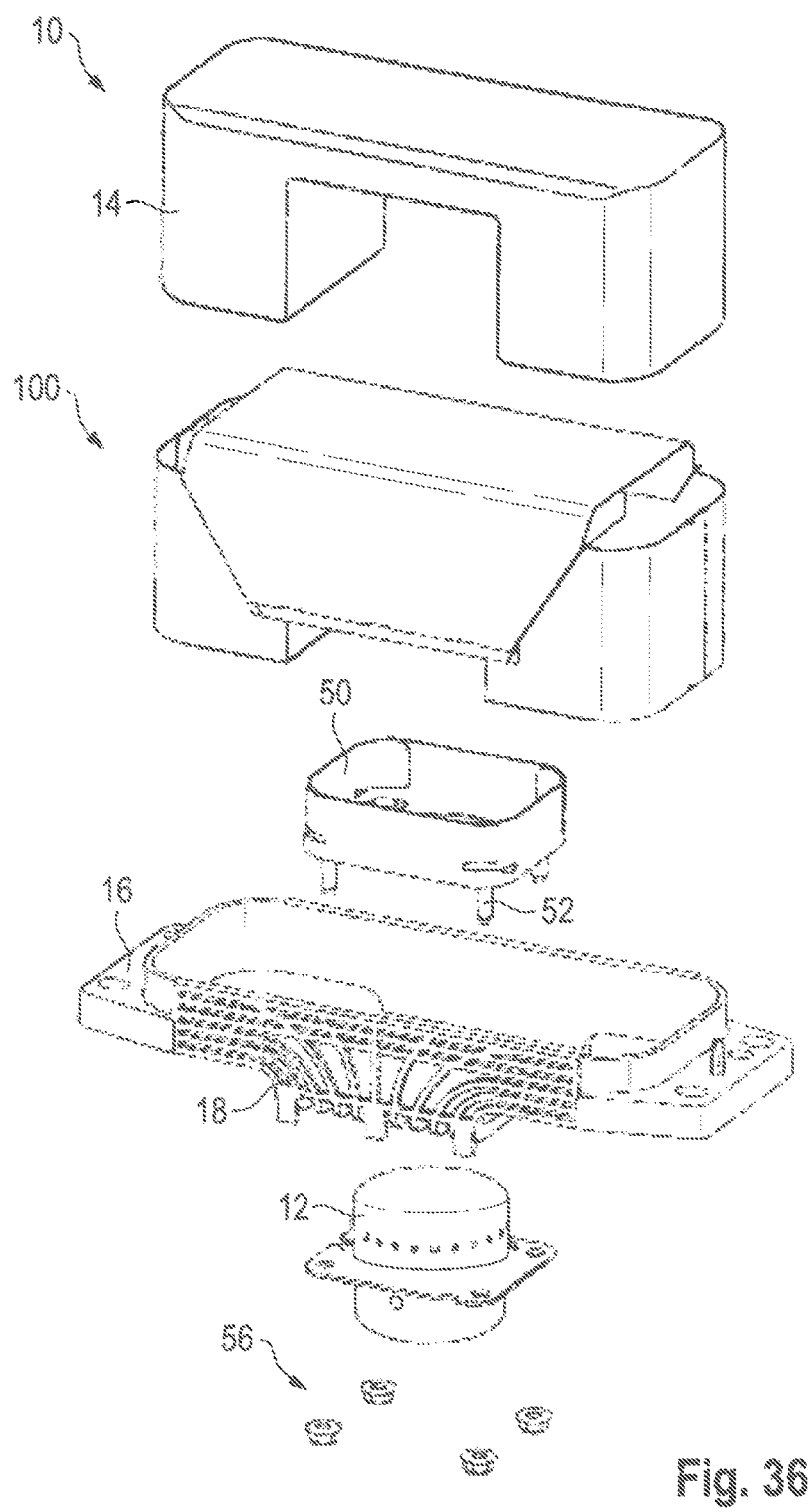
FIG. 36 shows an exploded view of an airbag module according to the invention in accordance with another embodiment.
Figure 37:
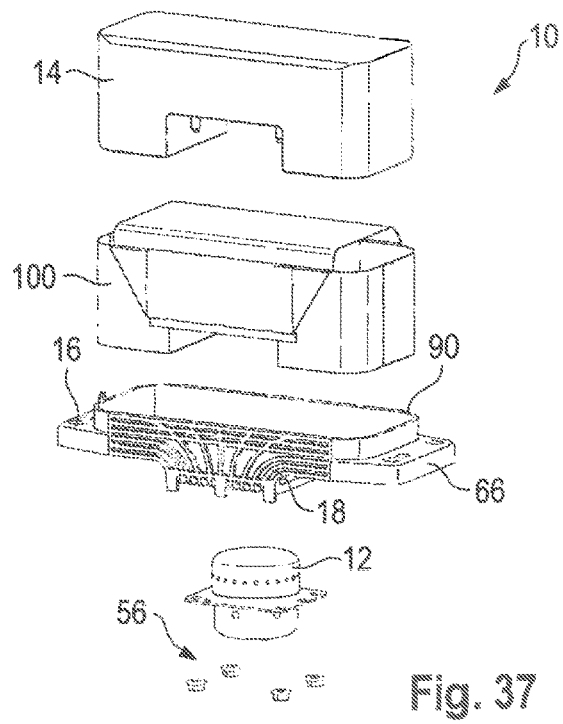
FIG. 37 shows another perspective view of the airbag module according to FIG. 36.
Figure 38:
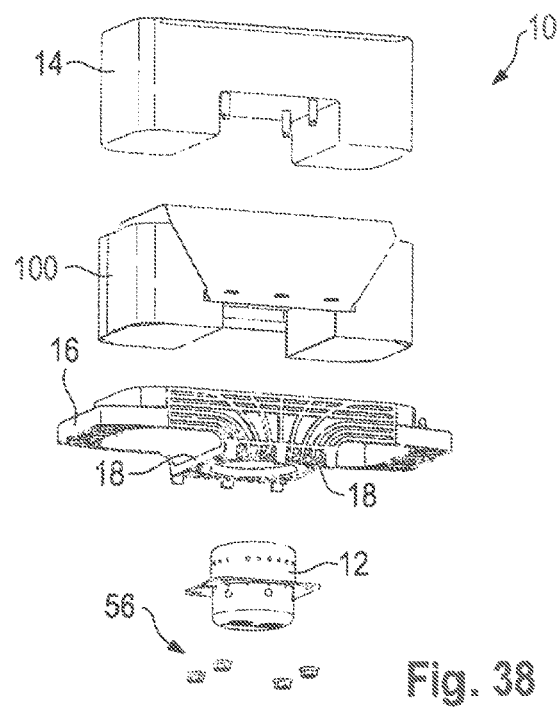
FIG. 38 shows another perspective view of the airbag module according to FIGS. 36 and 37.
Figure 39:
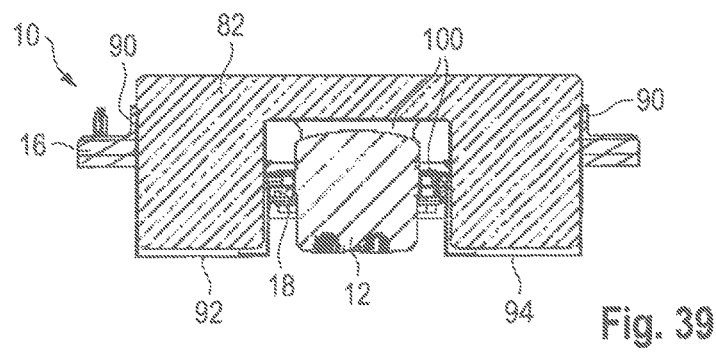
FIG. 39 shows a sectional view of the airbag module according to FIGS. 36 to 38.
Figure 40:
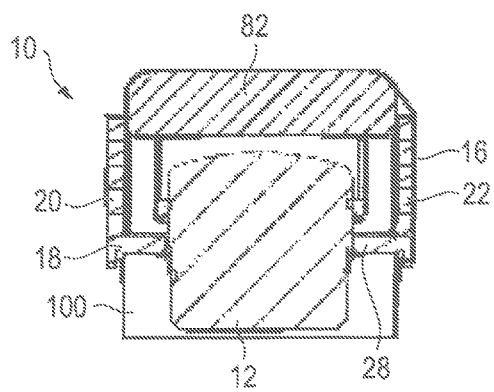
FIG. 40 shows another sectional view of the airbag module according to FIGS. 36 to 39.
Figure 41:
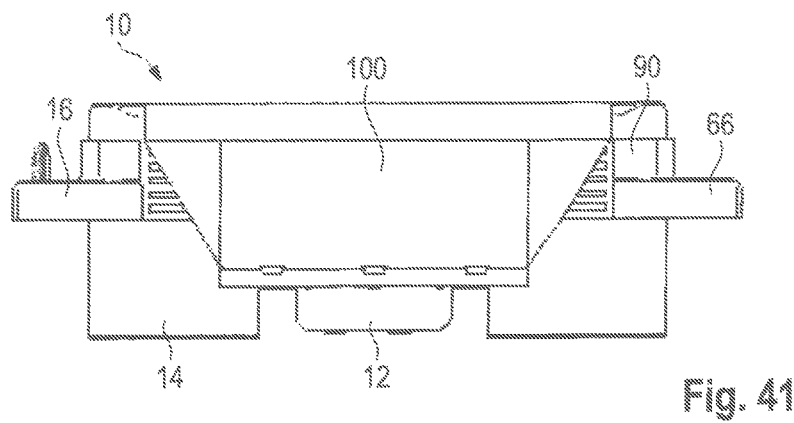
FIG. 41 shows a side view of the airbag module according to FIGS. 36 to 40.
Figure 42:
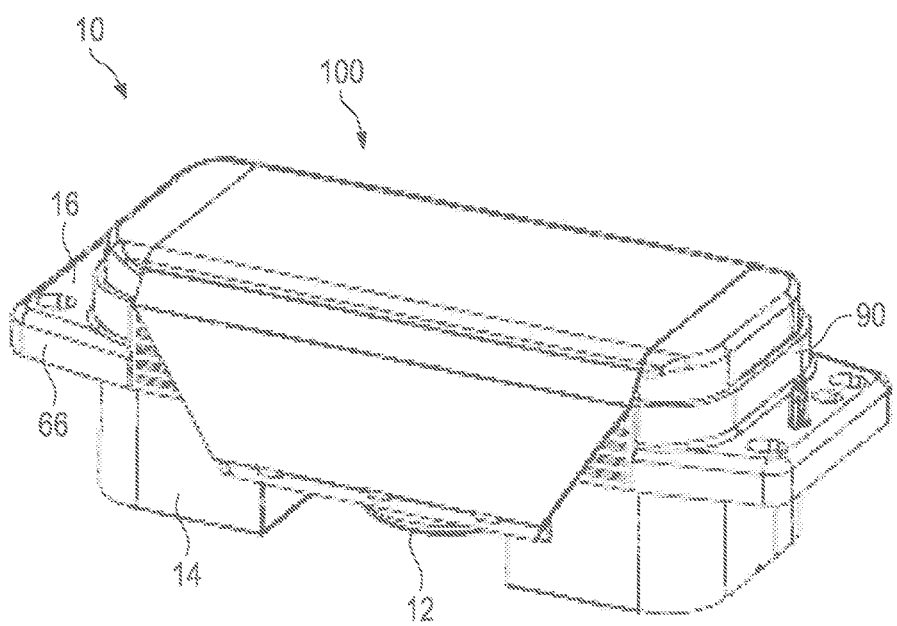
FIG. 42 shows a perspective view of the assembled airbag module of FIGS. 36 to 41.
Figure 43:
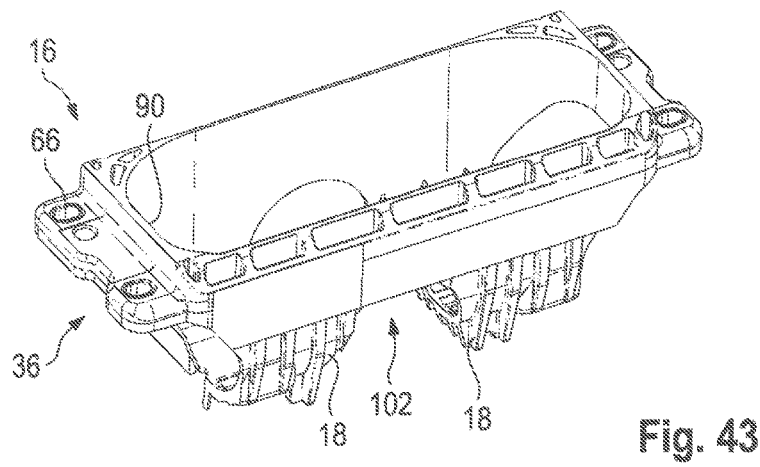
FIG. 43 shows a perspective view of a support structure for an airbag module according to the invention in accordance with another embodiment.

In addition, the holding element 50 is shown separately i.e. outside of the housing 14, in FIG. 36.

The housing 14 is inserted in the protective cover 100. As an alternative, the protective cover 100 may be provided to merely enclose the airbag 82 which is disposed along with the protective cover 100 in the housing 14 so that the protective cover 100 is first inserted into the housing 14 before the airbag 82 is introduced to the housing 14.

In general, the airbag 82 when being provided in the folded state may be a thermally fixed package.

Generally, the airbag 82 is provided to be fastened merely to the supporting portion 18 of the support structure 16 U-shaped in cross-section, which is ensured by means of the holding element 50.

Figure 49:
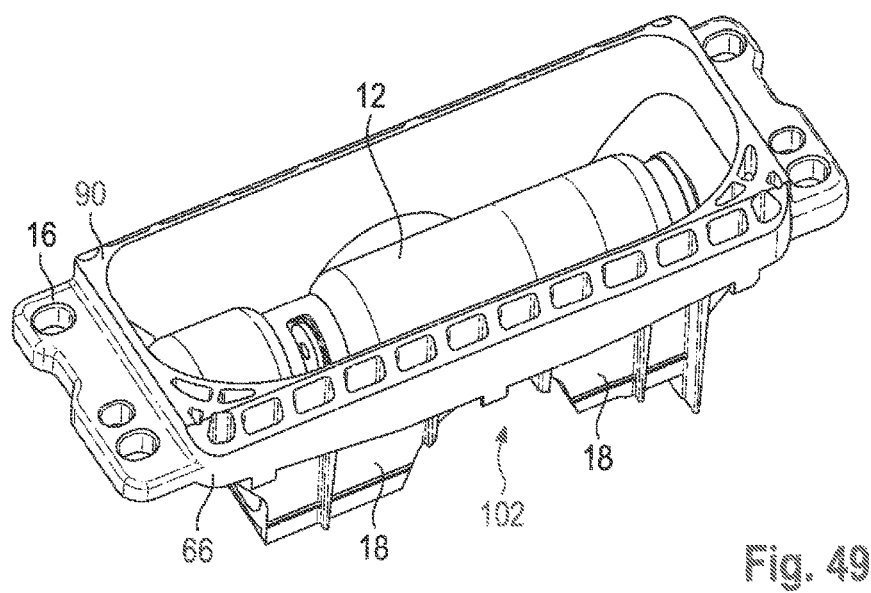
FIG. 49 shows a perspective view of the support structure according to FIGS. 43 to 48 with the inflator being inserted.
Figure 50:
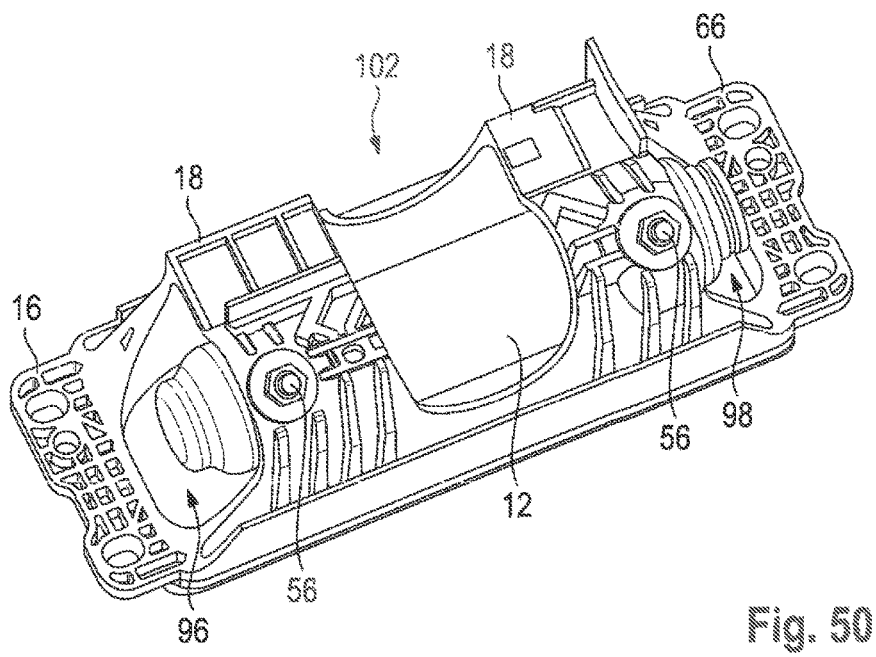
FIG. 50 shows another perspective view of the support structure according to FIGS. 43 to 48 with the inflator being inserted.

In FIGS. 43 to 50 another embodiment of the airbag module 10 is illustrated, wherein in FIGS. 43 to 48 merely the support structure 16 of the airbag module 10 is shown and in FIGS. 49 and 50 the support structure 16 is shown including the inflator 12.

The support structure 16 excels by including the peripheral frame 66 from which two supporting portions 18 U-shaped in cross-section project in the direction opposed to the fastening portion 38.

The two supporting portions 18 U-shaped in cross-section serve, analogously to the afore-described embodiments, for mounting the inflator 12 not shown in said FIGS. 43 to 48 on the support structure 16.

The support structure 16 and thus the correspondingly formed airbag module 10 are especially suited for inflators 12 of elongate or tubular shape so that there should be more than one connecting point with the support structure 16.

Accordingly, the holding portion 57 of this support structure 16 has two connecting areas via which the inflator 12 can be mounted on the support structure 16 in a locked manner.

Figure 44:
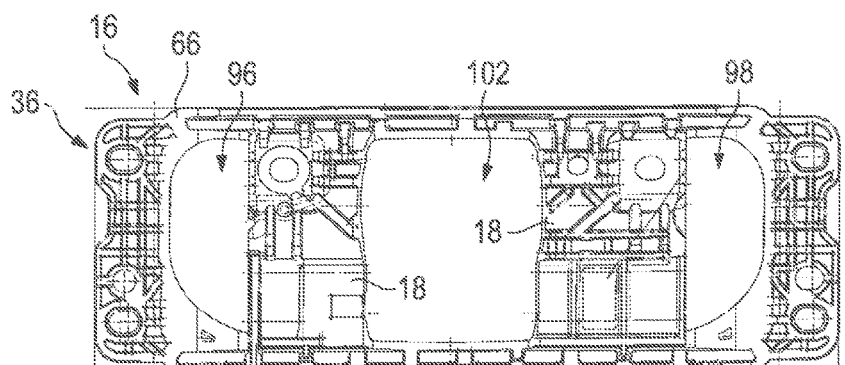
FIG. 44 shows a view from the bottom onto the support structure according to FIG. 43.
Figure 45:
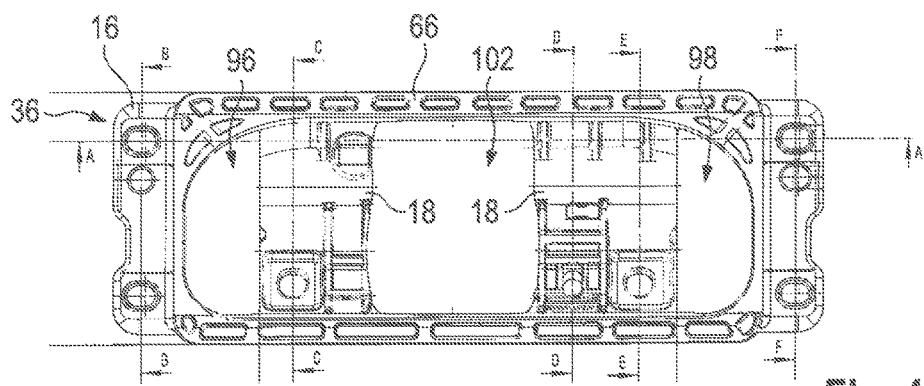
FIG. 45 shows a top view onto the support structure according to FIGS. 43 and 44.
Figure 46:
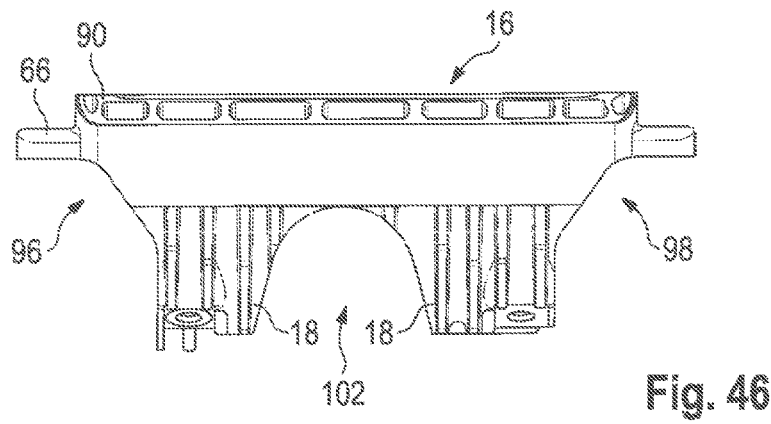
FIG. 46 shows a side view of the support structure according to FIGS. 43 to 46.
Figure 47:
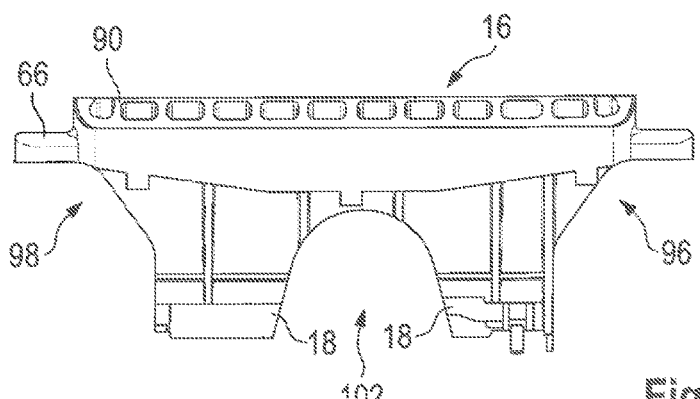
FIG. 47 shows another side view of the support structure according to FIGS. 43 to 46.
Figure 48:
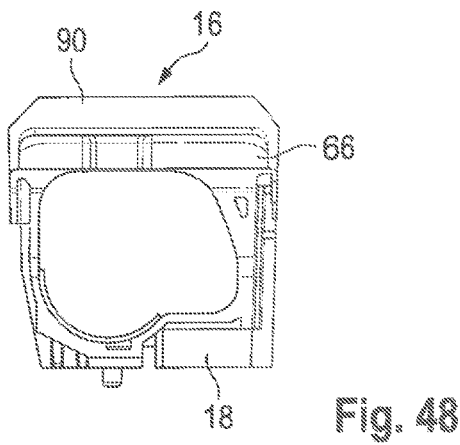
FIG. 48 shows another side view of the support structure according to FIGS. 43 to 47.

As can be inferred especially from FIGS. 44 and 45, the support structure 16 otherwise includes merely the peripheral frame 66 from which the collar 90 extends perpendicularly upwards. Between the two supporting portions 18 U-shaped in cross-section a recess 102 is provided, whereas between a supporting portion 18 and the appropriately opposed portion of the frame 66 the opening 96, 98 is provided. In this way, the support structure 16 can be configured to be appropriately light-weight.

In this embodiment, the inflator 12 can either be inserted through the opening enclosed by the peripheral frame 66 or through a lateral opening of the support structure 16 and then can be fastened.

The holding portion 57 in this embodiment is provided solely by the support structure 16, especially by the at least one supporting portion 18 or by the two provided supporting portions 18.

The inflator 12 is fastened, analogously to the preceding embodiments, from outside, because the counter-means 56 are equally disposed on the outside of the U-shaped supporting portions 18 (cf. especially FIG. 50).

The housing 14 is not shown in the illustrated Figures for reasons of clarity. However, it is fastened to the support structure 16 in a way analogous to the previously described Figures, especially in the area of the fastening portion 36 formed by the peripheral frame 66.

All of the airbag modules 10 of the preceding embodiments have a supporting portion 18 extending only over a partial length of the frame 66 so that openings 96, 98 are provided next to the supporting portion 18. A supporting portion 18 configured in this way may also be referred to as bracket.

Figure 51:
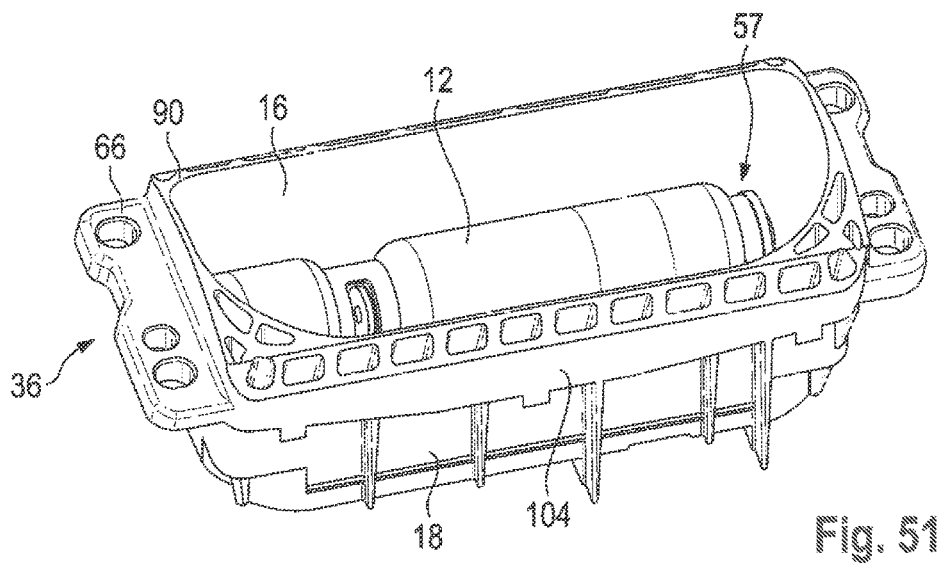
FIG. 51 shows a perspective view of a support structure according to another embodiment with the inflator being inserted.

In FIG. 51 another embodiment of the airbag module 10 according to the invention is shown, wherein merely the support structure 16 including the inflator 12 arranged thereon is shown.

In this embodiment, the support structure 16 includes the peripheral frame 66 from which one single supporting portion 18 U-shaped in cross-section extends facing away from the fastening portion 36 in the direction of the holding portion 57 and at least partially forms the holding portion 57.

The supporting portion 18 in this embodiment is trough-shaped so that it has a closed outer surface without any opening.

Moreover, in this embodiment a peripheral wall 104 is shown which extends from the peripheral frame 66 to the holding portion 57. Said peripheral wall 104 serves for further increasing the inherent stability of the airbag module 10.

The peripheral wall 104 may also be provided in the other embodiments, especially in those having a bracket-type supporting portion 18. Here the peripheral wall 104 may contribute to shaping the housing 14.

All embodiments of the airbag module 10 according to the invention excel by the fact that they have a peripheral frame 66 ensuring the required stability in the area of the fastening portion 36 so that the airbag module 10 can be fastened to the instrument panel 86 via the fastening portion 36.

At the same time, the airbag module 10 is ensured to maintain its intended shape.

Nevertheless, the airbag module 10 can be configured to be light-weight, as the housing 14 is made from fabric material which is lighter than the support structure 16. The support structure 16 merely serves for stabilizing the otherwise flexible and not dimensionally stable housing 4.

The invention claimed is:

1. An airbag module (10) for attaching to an instrument panel (86), the airbag module comprising an inflator (12), a fastening portion (36) which is arranged so that the airbag module (10) can be attached to the instrument panel (86) via the fastening portion (36), a receiving portion (46) for an airbag (82) as well as a holding portion (57) serving for holding the inflator (12), wherein the airbag module (10) includes a support structure (16) including the fastening portion (36) and a housing (14) made from fabric material, and wherein the holding portion (57) is partially formed in a holding area (58) of the housing (14) which is opposed to the fastening portion (36) so that the inflator (12) is fastened from outside and extends at least partially into the receiving portion (46), wherein the support structure (16) includes at least one supporting portion (18) being U-shaped in cross-section which at least partially encompasses the housing (14), wherein a bottom area (28) of the at least one U-shaped supporting portion (18) having a length that is less than a length of the housing (14) so that the bottom area (28) extends over a partial length of the encompassed housing (14), and wherein the support structure (16) includes a peripheral frame (66).

2. The airbag module (10) according to claim 1, wherein the holding portion (57) comprises a recess (48) in the housing (14) and a separate holding element (50) which is arranged at an inner side of the housing (14) so as to fix the inflator (12).

3. The airbag module (10) according to claim 1, wherein the support structure (16) includes a holder (78) and a clamping rail (80) arranged thereon, wherein at least one fabric layer of the housing (14) is clamped in the fastened state between the holder (78) and the clamping rail (80).

4. The airbag module (10) according to claim 3, wherein the holder (78) and the clamping rail (80) form a clip connection (83).

5. The airbag module (10) according to claim 1, wherein there is provided the airbag (82) which is connected to the housing (14).

6. The airbag module (10) according to claim 1, wherein the airbag (82) is provided which is connected to the support structure (16) on the at least one U-shaped supporting portion (18).

7. The airbag module (10) according to claim 1, wherein the housing (14) is connected to the support structure (16) in the area of the fastening portion (36).

8. The airbag module (10) according to claim 1, wherein the housing (14) is secured by the support structure (16) via a welded joint and/or via a clamping connection.

9. The airbag module (10) according to claim 8, wherein the clamping connection includes at least one clamping element (68, 70), wherein at least one fabric layer of the housing (14) is clamped between the clamping element (68, 70) and the support structure (16) so as to secure the housing (14) to the support structure (16).

10. The airbag module (10) according to claim 1, wherein the peripheral frame (66) forms the fastening portion (36).

11. The airbag module (10) according to claim 1, wherein the at least one U-shaped supporting portion (18) is formed integrally with the peripheral frame (66).

12. The airbag module (10) according to claim 1, wherein a collar projects perpendicularly from the peripheral frame (66).

13. The airbag module (10) according to claim 12, wherein the collar projects in the direction opposite to the at least one U-shaped supporting portion (18).

14. The airbag module (10) according to claim 1, wherein the support structure (16) at least partially forms the holding portion (57).

15. The airbag module (10) according to claim 14, wherein the at least one U-shaped supporting portion (18) at least partially forms the holding portion (57).

16. The airbag module (10) according to claim 1, wherein the support structure (16) includes two supporting portions (18) U-shaped in cross-section which at least partially encompass the housing (14).

17. The airbag module (10) according to claim 16, wherein each of the U-shaped supporting portions (18) have a bottom area (28) with a length that is less than the length of the housing (14), the bottom areas (28) of the two U-shaped portions (18) being completely separated from one another by a recess (102).

18. A subassembly (84) consisting of an instrument panel (86) and an airbag module (10) according to claim 1.

19. The subassembly (84) according to claim 18, wherein the instrument panel (86) includes fixing elements (88) in which the airbag module (10) is inserted and secured.

20. The airbag module (10) according to claim 1, wherein the bottom area (28) includes a hole (30) formed centrally therein, and wherein the inflator (12) extends through the supporting portion (18) via the hole (30).

* * * * *